(12) United States Patent
Lecue et al.

(10) Patent No.: US 10,769,561 B2
(45) Date of Patent: Sep. 8, 2020

(54) ADAPTIVE LOGISTICS PLATFORM FOR GENERATING AND UPDATING SCHEDULES USING NATURAL LANGUAGE PROCESSING

(71) Applicant: Accenture Global Solutions Limited, Dublin (IE)

(72) Inventors: Freddy Lecue, Dublin (IE); Jiewen Wu, Dublin (IE); John Vard, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 745 days.

(21) Appl. No.: 15/291,743

(22) Filed: Oct. 12, 2016

(65) Prior Publication Data

US 2018/0101800 A1    Apr. 12, 2018

(51) Int. Cl.
| | |
|---|---|
| *G06Q 10/06* | (2012.01) |
| *G06F 16/2457* | (2019.01) |
| *G06F 16/25* | (2019.01) |
| *G06F 16/2452* | (2019.01) |
| *G06F 40/30* | (2020.01) |
| *G06F 40/205* | (2020.01) |

(52) U.S. Cl.
CPC .... *G06Q 10/06311* (2013.01); *G06F 16/24522* (2019.01); *G06F 16/24578* (2019.01); *G06F 16/252* (2019.01); *G06F 40/205* (2020.01); *G06F 40/30* (2020.01)

(58) Field of Classification Search
None
See application file for complete search history.

(56) References Cited

U.S. PATENT DOCUMENTS

| | | | |
|---|---|---|---|
| 4,862,357 A | 8/1989 | Ahlstrom et al. | |
| 5,732,398 A | 3/1998 | Tagawa | |
| 6,038,554 A * | 3/2000 | Vig | G06Q 10/0875 |
| | | | 705/306 |
| 2002/0032589 A1 | 3/2002 | Shah | |
| 2002/0156661 A1 | 10/2002 | Jones et al. | |
| 2003/0023463 A1 | 1/2003 | Dombroski et al. | |
| 2004/0162829 A1 | 8/2004 | Gabos et al. | |

(Continued)

OTHER PUBLICATIONS

Gavalas, Dannianos et al; "A survey on algorithmic approaches for solving tourist trip design problems"; May 14, 2014; Journal of Heuristics; vol. 20, Issue 3; pp. 291-328 (Year: 2014).*

*Primary Examiner* — Leland Marcus
(74) *Attorney, Agent, or Firm* — Harrity & Harrity, LLP

(57) ABSTRACT

A device may receive user preference data and company preference data associated with one or more bookable items. The device may obtain external preference data associated with the one or more bookable items. The external preference data may be different from the user preference data and the company preference data. The device may generate a list of schedules based on the user preference data, the company preference data, and the external preference data. The device may generate one or more category scores for a plurality of schedules included in the list of schedules based on the company preference data. The device may rank the list of schedules based on the one or more category scores. The device may select a schedule, from the ranked list of schedules, based on the one or more category scores. The device may perform an action based on selecting the schedule.

20 Claims, 7 Drawing Sheets

(56) References Cited

U.S. PATENT DOCUMENTS

| | | | |
|---|---|---|---|
| 2010/0048242 A1* | 2/2010 | Rhoads | G06K 9/6253 |
| | | | 455/556.1 |
| 2012/0203708 A1* | 8/2012 | Psota | G06Q 30/02 |
| | | | 705/347 |
| 2013/0282341 A1* | 10/2013 | Takahashi | G06F 17/5009 |
| | | | 703/2 |
| 2014/0164171 A1* | 6/2014 | Lu | G06Q 30/0207 |
| | | | 705/26.7 |
| 2014/0282586 A1* | 9/2014 | Shear | G06F 9/5072 |
| | | | 718/104 |
| 2015/0058056 A1 | 2/2015 | Comerford et al. | |
| 2015/0142704 A1* | 5/2015 | London | G06N 5/022 |
| | | | 706/11 |
| 2015/0269328 A1 | 9/2015 | Wiley et al. | |
| 2016/0239614 A1* | 8/2016 | Siva | G06F 16/9577 |
| 2016/0314554 A1* | 10/2016 | Pillac | G01C 21/3407 |
| 2017/0059341 A1* | 3/2017 | Vo | G01C 21/3446 |
| 2017/0228517 A1* | 8/2017 | Saliman | G16H 10/20 |
| 2018/0097940 A1* | 4/2018 | Beilis | G06F 17/27 |

\* cited by examiner

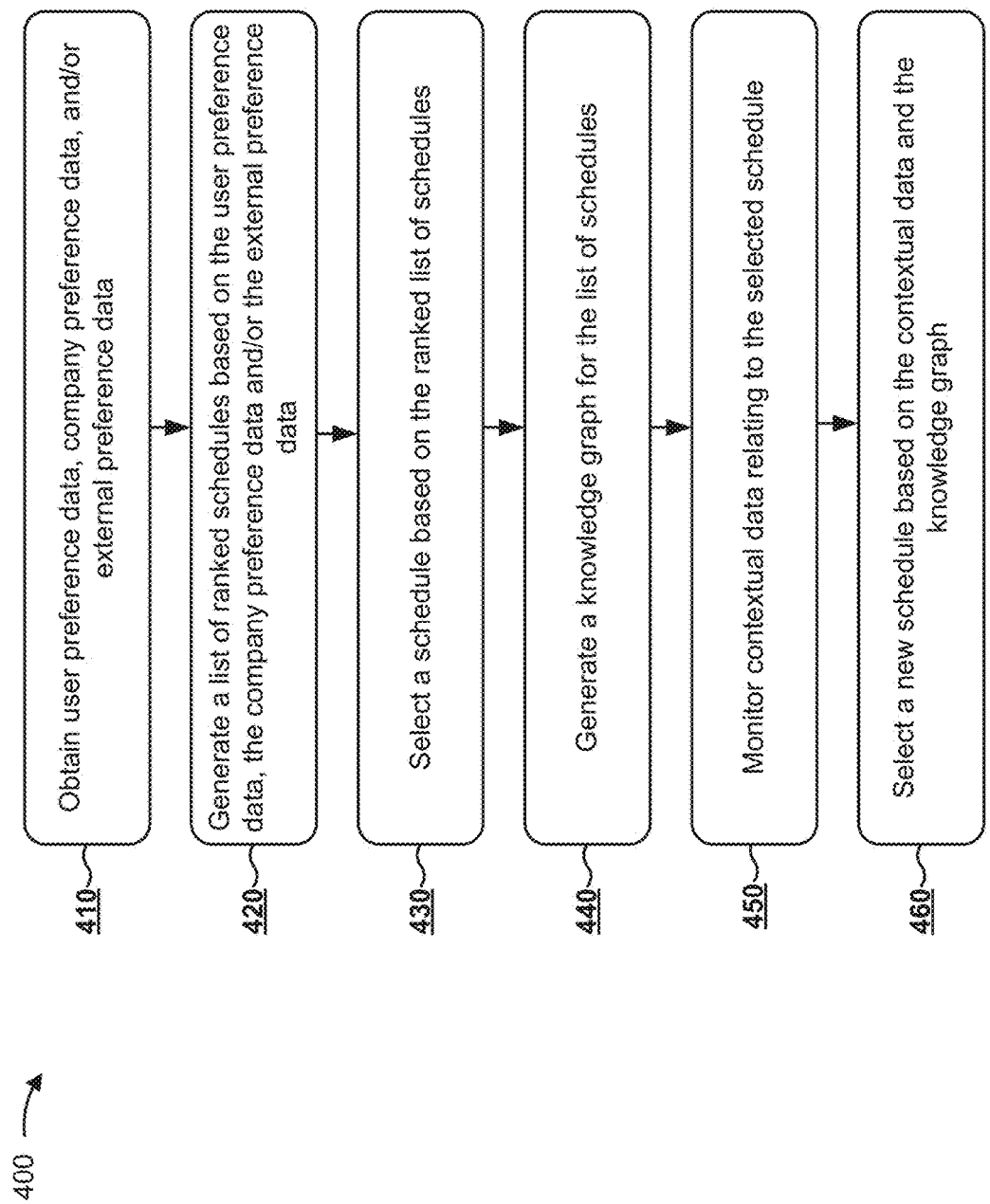

ADAPTIVE LOGISTICS PLATFORM FOR GENERATING AND UPDATING SCHEDULES USING NATURAL LANGUAGE PROCESSING

BACKGROUND

Creating a schedule for an event may be difficult in those situations when different priorities of objects of the event are to be considered. Manual creation of the schedule may be impossible when thousands, tens of thousands, or even hundreds of thousands of objects need to be considered.

SUMMARY

According to some possible implementations, a device may include one or more processors to receive user preference data and company preference data associated with one or more bookable items. The one or more processors may obtain external preference data associated with the one or more bookable items. The external preference data may be different from the user preference data and the company preference data. The one or more processors may generate a list of schedules based on the user preference data, the company preference data, and the external preference data. The one or more processors may generate one or more category scores for a plurality of schedules included in the list of schedules based on the company preference data. The one or more processors may rank the list of schedules based on the one or more category scores. The one or more processors may select a schedule, from the ranked list of schedules, based on the one or more category scores. The one or more processors may perform an action based on selecting the schedule.

According to some possible implementations, a method may include receiving, by a device, internal preference data associated with one or more bookable items. The method may include obtaining, by the device, external preference data associated with the one or more bookable items. The external preference data may be different from the internal preference data. The external preference data may be obtained by extracting text from an external source. The method may include generating, by the device, a list of schedules based on the internal preference data and the external preference data. The method may include generating, by the device, one or more category scores for a plurality of schedules included in the list of schedules. The method may include ranking, by the device, the list of schedules based on the one or more category scores. The method may include identifying, by the device, a selected schedule of the ranked list of schedules. The method may include performing, by the device, an action based on selecting the schedule.

According to some possible implementations, a non-transitory computer-readable medium may store one or more instructions that, when executed by one or more processors, cause the one or more processors to receive user preference data associated with one or more bookable items. The one or more instructions may cause the one or more processors to receive company preference data associated with the one or more bookable items. The one or more instructions may cause the one or more processors to obtain external preference data associated with the one or more bookable items. The external preference data may be different from the user preference data and the company preference data. The one or more instructions may cause the one or more processors to generate a list of schedules based on the user preference data, the company preference data, and the external preference data. The one or more instructions may cause the one or more processors to generate one or more category scores for a plurality of schedules included in the list of schedules. The one or more instructions may cause the one or more processors to rank the list of schedules based on the one or more category scores. The one or more instructions may cause the one or more processors to select a schedule, from the ranked list of schedules, based on the one or more category scores.

BRIEF DESCRIPTION OF THE DRAWINGS

FIG. 4 is a flow chart of an example process for generating and updating schedules based on preferences data, competing objectives, and contextual data associated with events that may impact the schedule.

DETAILED DESCRIPTION

Figure 1A:
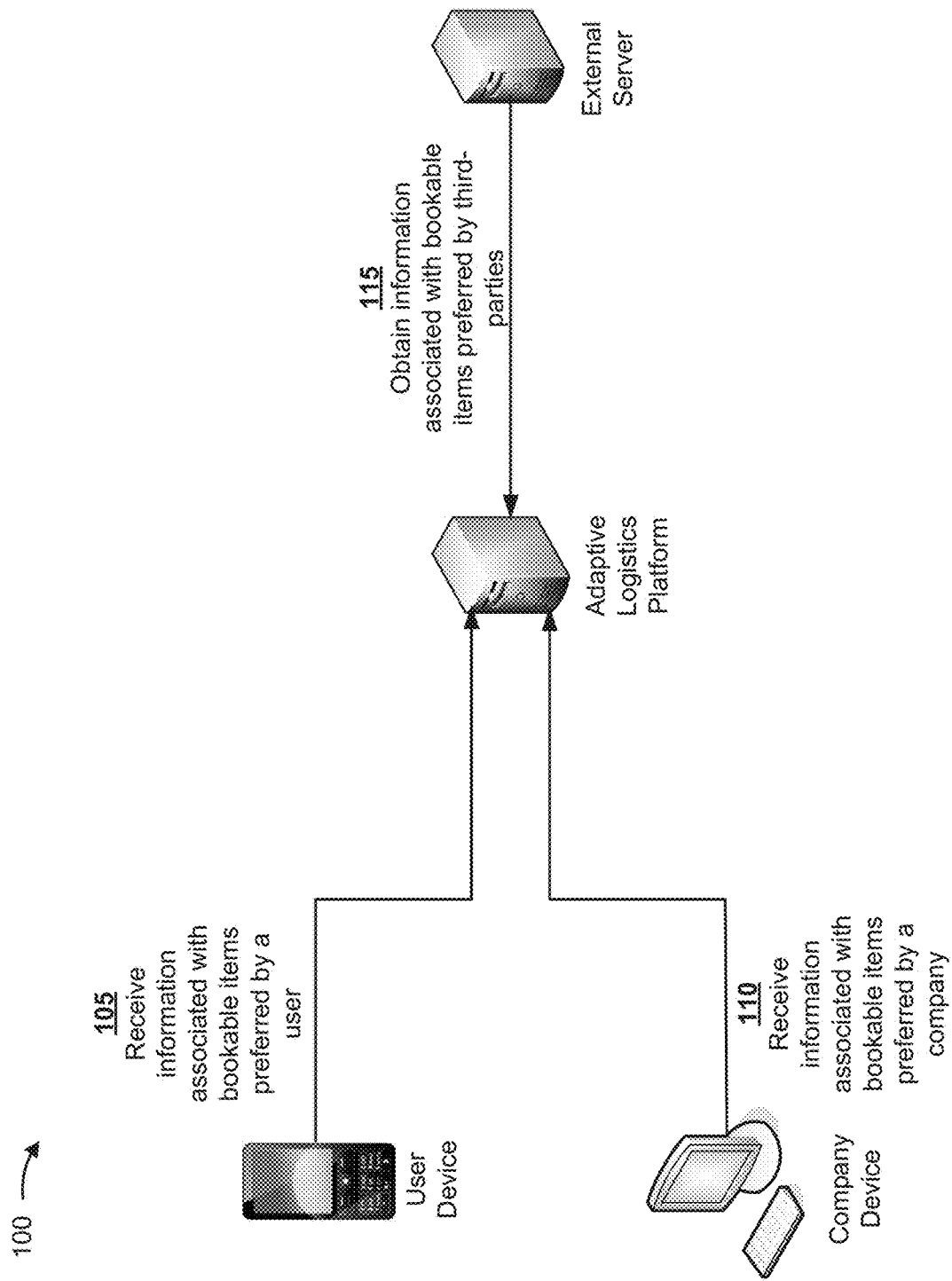
FIGS. 1A-1D are diagrams of an overview of an example implementation described herein.

The following detailed description of example implementations refers to the accompanying drawings. The same reference numbers in different drawings may identify the same or similar elements.

Creating schedules for events often involves consideration of competing priorities. As a simple example, a schedule for an event, such as a company retreat, a business trip, or the like, may need to account for competing priorities between a company and a large group of attending employees. Competing priorities may include the degree to which the company and the large group of attending employees value safety, health, budget, free time, and/or any other individual personal preference to which the parties may differ. Generating schedules that attempt to balance hundreds, often thousands, of competing priorities against hundreds, often thousands, of users, may be difficult due the magnitude of different priorities that may exist between different users (e.g., a schedule for a company retreat or business trip may involve scheduling events for a company on a fixed budget, for 1,000+ employees, where each of the 1,000+ employees have different budgets, different food preferences, different health and safety preferences, different lifestyle choices, etc.).

As an example to demonstrate the magnitude of this problem, assume a schedule for a company trip involves booking ten items or events (e.g., the schedule may include a flight provider, a group of hotels for the company employees to stay, a means of transit for traveling from the group of hotels to nearby destinations, three dinner reservations at three separate restaurants, and four different events or tourist attractions for the weekend). There may be as many as ten to twenty different airlines to choose between, fifty to one hundred different hotels to stay at, five to ten different modes of travel to choose between, hundreds of different restaurants to choose between, and hundreds of different tourist attractions to choose between. Further complicating the scheduling, the 1,000+ employees may have different safety interests, different health interests, different budgets, different amounts of free time, and the like. This creates millions of permutations of possible schedules, while only a small portion of these schedules may adequately account for the competing priorities and preferences of the parties.

As a result, selecting the best possible schedule, or even a schedule that is better than most, may be extremely challenging and resource intensive due to the multitude of bookable items and the arrangement of the bookable items, competing priorities or objectives (e.g., health, safety, cost, time, etc.), competing preferences (e.g., between multiple people who will be using the schedule, between a person and a company, etc.), or the like. Furthermore, if an event occurs that impacts the schedule (e.g., a terrorist attack, a strike, closing of a bookable item, etc.), updating the schedule quickly to account for the event may be extremely challenging and resource intensive.

Implementations described herein include an adaptive logistics platform for generating schedules that account for a variety of different competing priorities and preferences, and for updating those schedules as plans change or as events occur that impact the schedules. In addition, implementations described herein may utilize natural language processing techniques to further improve accuracy and performance of schedule generation. Furthermore, implementations described herein may use artificial intelligence models to predict when a user may deviate from a selected schedule. While the implementations described herein focus primarily on generating and updating schedules in the context of an employer-employee relationship (e.g., for a business trip, a company event, etc.), some implementations may apply to other contexts (e.g., buyer-supplier, parent-child, etc.).

By generating schedules that account for a variety of different competing priorities, and by updating the schedules to account for events that impact the schedules, the adaptive logistics platform intelligently selects the best schedule, or a schedule that is better than most. Furthermore, the adaptive logistics platform conserves processing resources by using natural language processing to improve the quality and accuracy of the schedules, and conserves processing resources by using artificial intelligence models to predict user deviations from planned schedules. In addition, implementations described herein improve overall performance and operation of the system due to efficient and effective allocation of resources.

FIGS. 1A-1D are diagrams of an overview of an example implementation 100 described herein. As shown in FIG. 1A, and by reference number 105, an adaptive logistics platform (e.g., a server, a cloud computing environment, etc.) may receive information associated with bookable items preferred by a user. For example, the adaptive logistics platform may receive information associated with bookable items preferred by a user when the user (e.g., an employee of a company), through an interface of a user device (e.g., a mobile device, a desktop computer, etc.), inputs bookable items (e.g., a specific hotel, a specific restaurant, etc.), or preferences that may be used to determine bookable items (e.g., a seafood allergy may be input, which may exclude the possibility of scheduling seafood restaurants). The adaptive logistics platform may receive, via a network, information associated with bookable items preferred by a user for hundreds, often thousands, of users.

As further shown in FIG. 1A, and by reference number 110, the adaptive logistics platform may receive information associated with bookable items preferred by a company. For example, the adaptive logistics platform may receive information associated with bookable items preferred by a company when a company manager or administrator, through an interface of a company device (e.g., a computer), inputs bookable items (e.g., a specific hotel, a specific restaurant, etc.), or preferences that may be used to determine bookable items (e.g., a seafood allergy may be input, which may exclude the possibility of scheduling seafood restaurants). The input company preferences may be sent to the adaptive logistics platform via a network.

As further shown in FIG. 1A, and by reference number 115, the adaptive logistics platform may obtain information associated with bookable items preferred by third-parties from an external server. For example, the adaptive logistics platform may use data mining techniques to extract third-party bookable item preferences from the external servers. As an example, the adaptive logistics platform may extract metadata tags from travel websites that include reviews of third-party travel preferences. The adaptive logistics platform may obtain information associated with bookable items preferred by third-parties for hundreds, often thousands, of third-party reviewers.

Figure 1B:
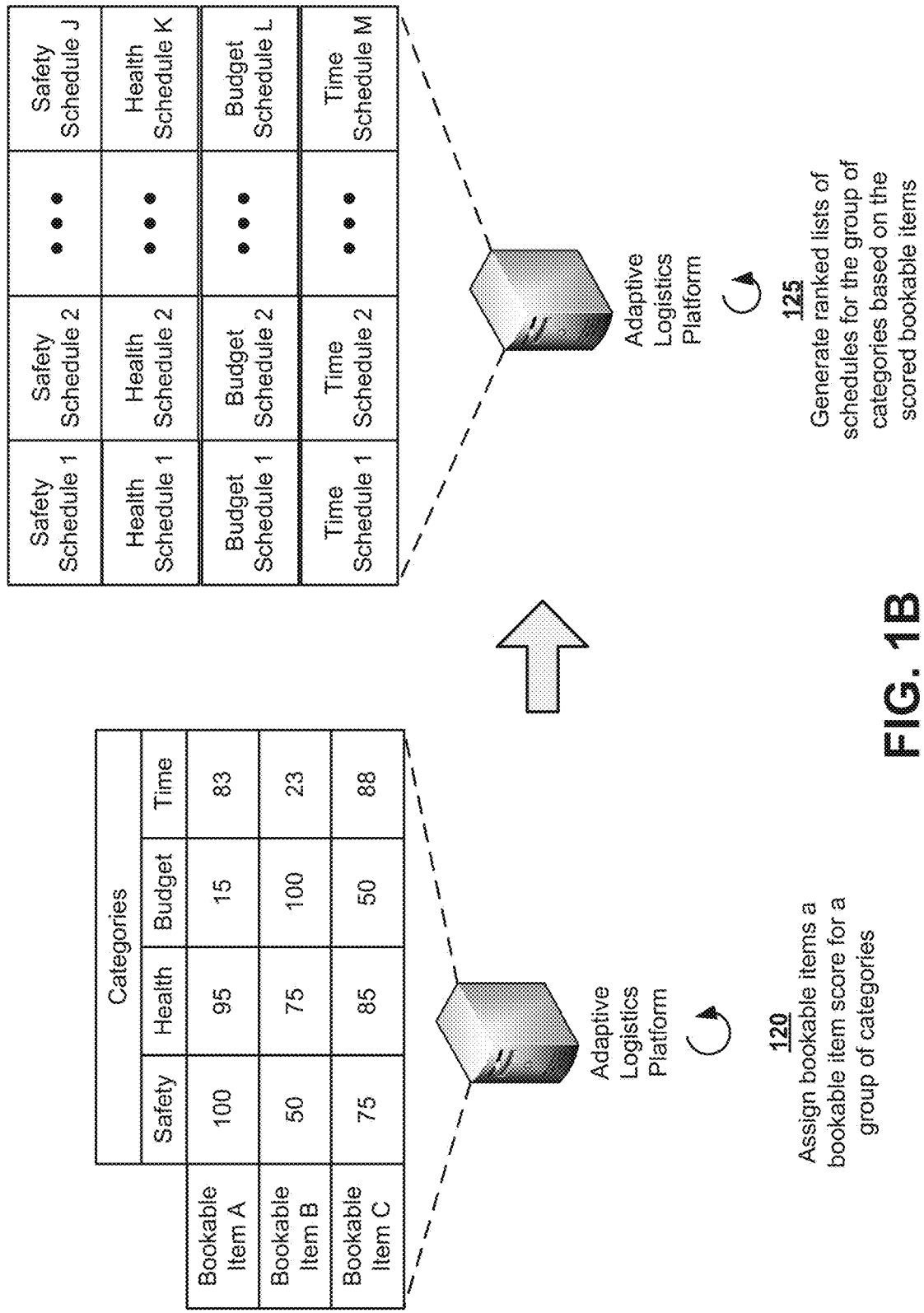

As shown in FIG. 1B, and by reference number 120, the adaptive logistics platform may assign bookable items a bookable item score for a group of categories. The group of categories may include a safety category, a health category, a budget category, and a time category. The adaptive logistics platform may, for a bookable item, assign a bookable item score for the safety category, assign a bookable item score for the health category, assign a bookable item score for the budget category, and assign a bookable item score for the time category. Bookable item scores may be assigned for hundreds, often thousands, of bookable items. In some implementations, the adaptive logistics platform may assign scores to bookable items based on third-party bookable item review scores (e.g., a bookable item review score may be extracted from a travel-related website). As an example, bookable item A may be a five-star hotel, and the adaptive logistics platform may extract, from a webpage that includes reviews of the five-star hotel, information about the five-star hotel (e.g., hotel amenities) that relates to safety, health, budget, and/or time. In this case, the adaptive logistics platform may perform a semantic analysis on the five-star hotel reviews and assign the five-star hotel category scores (e.g., a safety score of 100, a health score of 95, a budget score of 15, and a time score of 83) that indicate the bookable item scores in relation to particular categories. The adaptive logistics platform may use the category scores to generate, for each respective category, a ranked list of schedules.

As further shown in FIG. 1B, and by reference number 125, the adaptive logistics platform may generate ranked lists of schedules for the group of categories based on the scored bookable items. For example, the adaptive logistics platform may generate, based on the scored bookable items, a ranked list of safety schedules, a ranked list of health schedules, a ranked list of budget schedules, a ranked list of time schedules, or the like. By separating the schedules into ranked categorical lists, the adaptive logistics platform may provide ranked lists of schedules to the user that are specific to a particular user categorical preference.

Figure 1C:
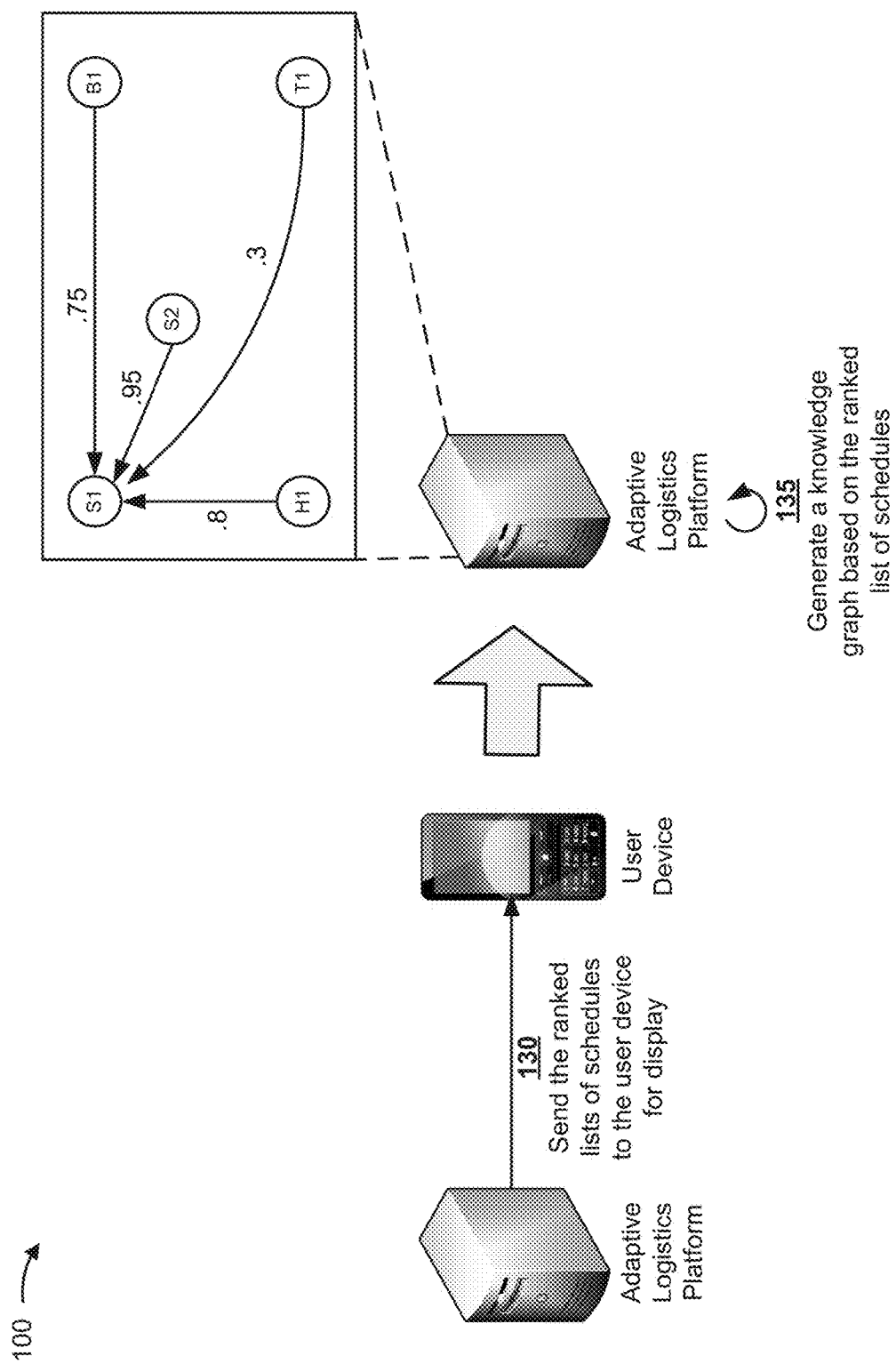

As shown in FIG. 1C, and by reference number 130, the adaptive logistics platform may send the ranked lists of schedules to the user device for display. For example, the ranked list of schedules may be displayed on an interface (e.g., an application interface, a web interface, etc.) of the user device. In this way, a user may be presented with a list of ranked schedules for each category, and may select a schedule from one of the ranked lists. As an example, a user, such as an employee or a company administrator, may prioritize safety as a preference, and the adaptive logistics platform may display the ranked list of safety categories ahead of the ranked list of health categories, budget categories, and time categories. The adaptive logistics platform may send the ranked lists of schedules to hundreds, often thousands, of user devices.

As further shown in FIG. 1C, and by reference number 135, the adaptive logistics platform may generate a knowledge graph based on the ranked list of schedules. The knowledge graph may represent a data structure that stores information regarding schedules (e.g., the nodes in the knowledge graph) and relationships between the schedules (e.g., the edges in the knowledge graph). In some implementations, the nodes of the knowledge graph may represent scores that correspond to categories for a schedule (e.g., a node may be associated with a safety score, a health score, a budget score, a time score), and the edges of the knowledge graph may represent scores indicating the degree of similarity between connected nodes. As shown as an example, an edge value of 0.95 from safety schedule 2 (S2) to safety schedule 1 (S1) may indicate that S2 is 95% similar to S1 (e.g., the values stored for safety, health, budget, and time may be 95% similar). The adaptive logistics platform may have hundreds, thousands, even millions, of nodes that indicate schedules, and the nodes may correspond to hundreds, thousands, even millions, of edge values indicating the relationships between the nodes.

Figure 1D:
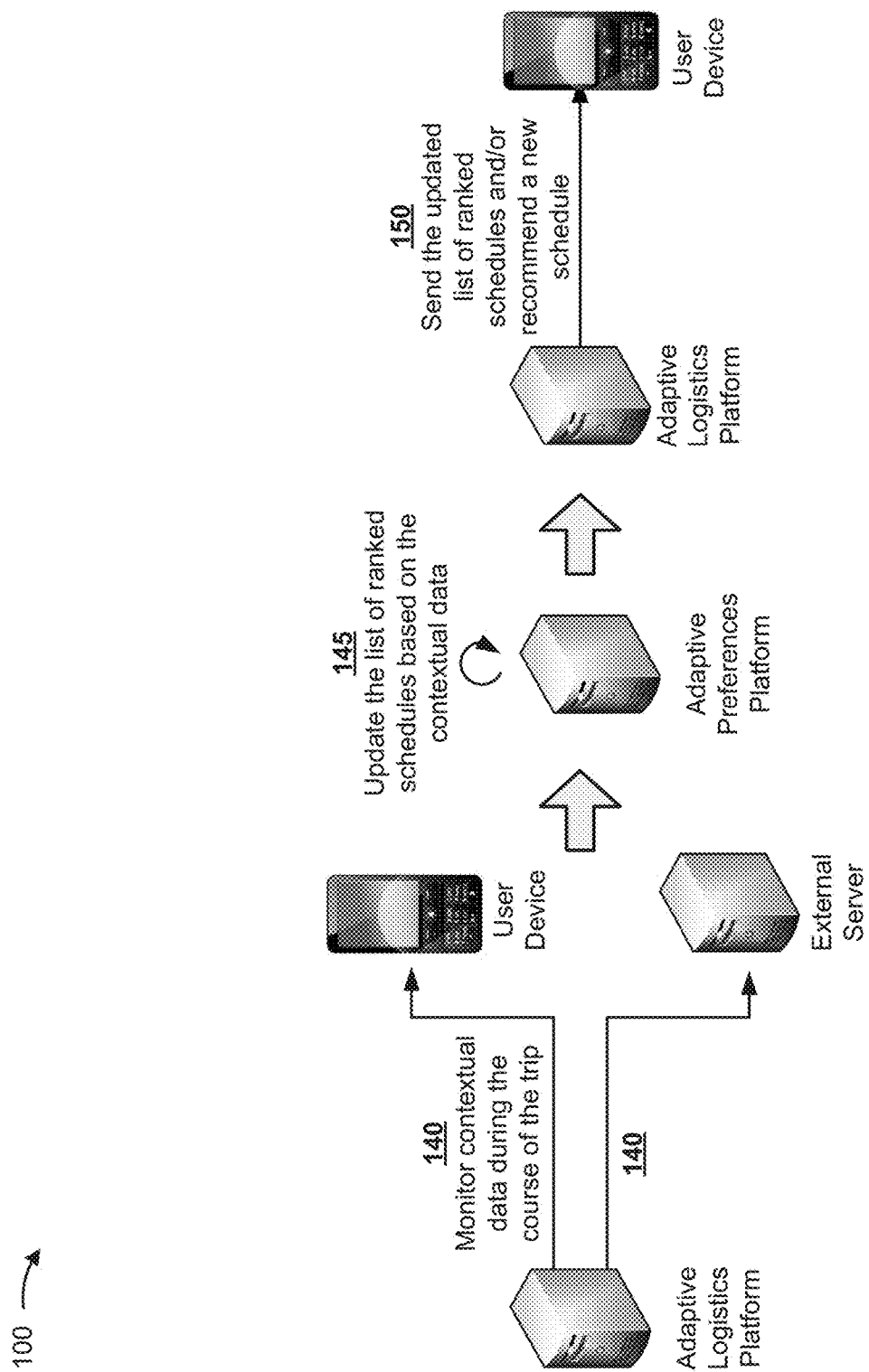

As shown in FIG. 1D, and by reference numbers 140, the adaptive logistics platform may monitor contextual data during the course of a trip associated with the selected schedule. For example, the adaptive logistics platform may monitor external events within a geographic area of the user device, within a geographic area of the bookable items included in the selected schedule, or the like. In this case, the adaptive logistics platform may use data mining techniques to extract data relating to external events (e.g., social media webpages, news outlets, etc.), and may use natural language processing techniques to analyze the extracted data to determine if events within the geographic region of the scheduled trip impact the schedule. As an example, the adaptive logistics platform may extract data from a news webpage indicating that a riot has occurred outside of a hotel included in the selected schedule. The adaptive logistics platform may use natural language processing techniques (e.g., a sentiment analysis, a semantic analysis, etc.) to determine that the environment outside of the scheduled hotel is now unsafe.

As further shown in FIG. 1D, and by reference number 145, the adaptive logistics platform may update the list of ranked schedules based on the contextual data. For example, assume a riot occurs in front of the scheduled hotel. To account for this event, the adaptive logistics platform may update the safety score of the node in the knowledge graph that represents the planned schedule (e.g., because a riot would make that schedule less safe), and the adaptive logistics platform may also update the edge values of the knowledge graph that may be influenced by updating the planned schedule node (e.g., because altering the safety value of the node will also change the degree of similarity between the node and connected nodes). In addition, the adaptive logistics platform may update the node values and corresponding edge values of all schedules that used the now unsafe hotel. The adaptive logistics platform may update the list of ranked schedules based on the changes to the knowledge graph.

As further shown in FIG. 1D, and by reference number 150, the adaptive logistics platform may send the updated list of ranked schedules to the user device, and/or may recommend a new schedule. If the selected schedule is updated with a low safety score due to an external event such as a riot, the selected schedule may no longer be the best choice for the user. As a result, the adaptive logistics platform may send the user device the updated list of ranked schedules and recommend a new schedule. In some implementations, the user may be prompted to accept or decline the new schedule, and may provide a reason for accepting or rejecting the schedule. The adaptive logistics platform may send the updated schedules to hundreds, often thousands, of user devices.

By generating schedules that account for competing preferences and priorities, and by updating the schedules based on external events, the adaptive logistics platform intelligently selects the best schedule, or a schedule that is better than most. In addition, the adaptive logistics platform conserves processing resources by using natural language processing to improve the quality and accuracy of the schedules, and improves overall system performance due to efficient and effective allocation of resources.

As indicated above, FIGS. 1A-1D are provided merely as an example. Other examples are possible and may differ from what was described with regard to FIGS. 1A-1D.

Figure 2:
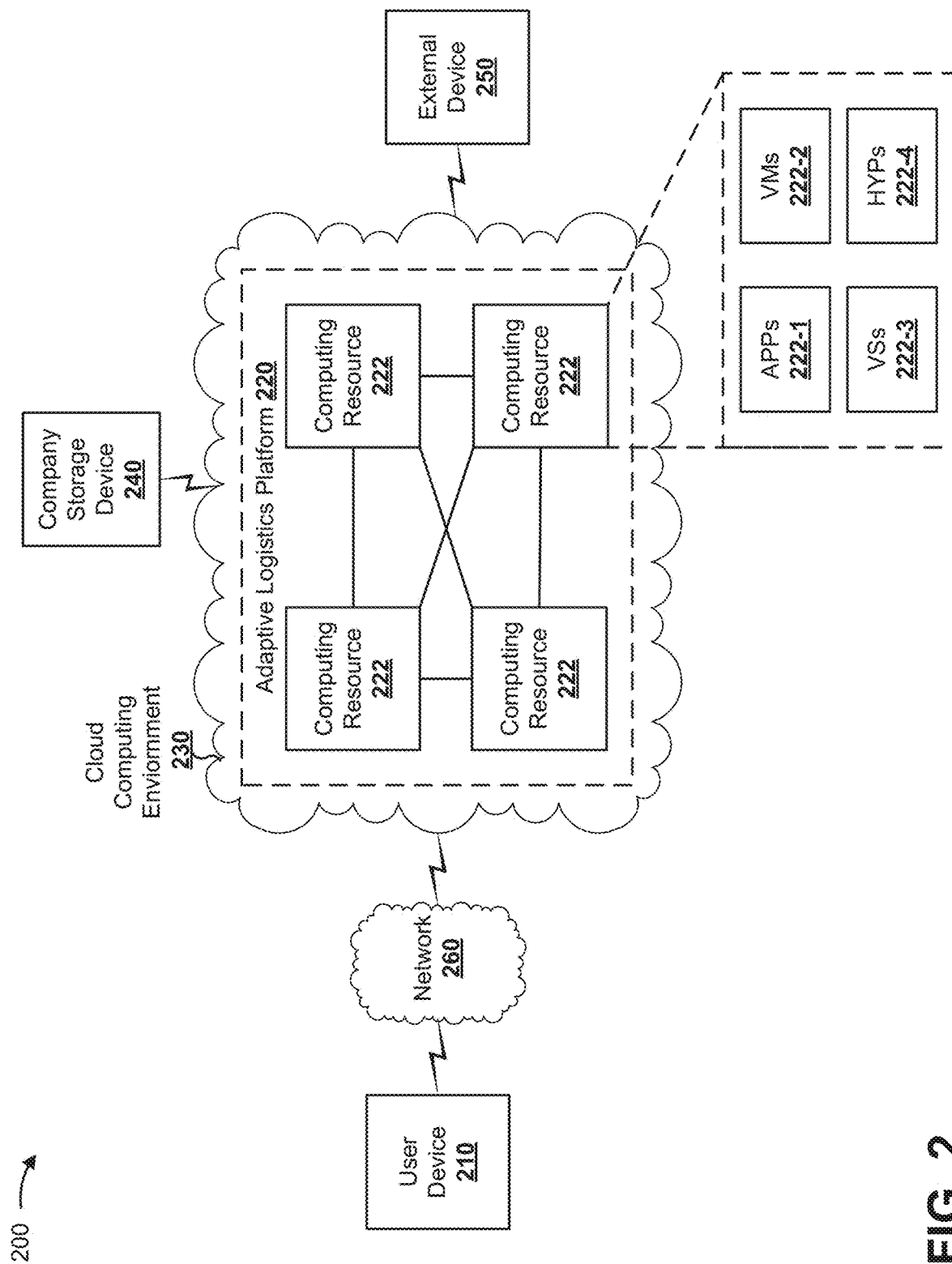
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an adaptive logistics platform 220 hosted within a cloud computing environment 230, a company storage device 240, an external device 250, and a network 260. Devices of environment 200 may interconnect via wired connections, wireless connections, or a combination of wired and wireless connections.

User device 210 includes one or more devices capable of receiving, generating, storing, processing, and/or providing information relating to generating, or updating a schedule. For example, user device 210 may include a computing device, such as a desktop computer, a laptop computer, a tablet computer, a server device, a mobile phone (e.g., a smart phone or a radiotelephone), a wearable computer (e.g., a smart watch, a smart band, a smart pair of eyeglasses, etc.), a camera, a sensor, or a similar type of device. In some implementations, user devices 210 may refer to a group of user devices associated with a group of corresponding users. Furthermore, user device 210 may include a global positioning system (GPS) tracking system and may send GPS measurements to adaptive logistics platform 220.

Adaptive logistics platform 220 includes one or more devices capable of receiving, generating, storing, processing, updating, and/or providing information associated with generating, or updating a schedule. For example, adaptive logistics platform 220 may include a cloud server or a group of cloud servers.

In some implementations, as shown, adaptive logistics platform 220 may be hosted in cloud computing environment 230. Notably, while implementations described herein describe adaptive logistics platform 220 as being hosted in cloud computing environment 230, in some implementations, adaptive logistics platform 220 may not be cloud-based (i.e., may be implemented outside of a cloud computing environment) or may be partially cloud-based.

Cloud computing environment 230 includes an environment that hosts adaptive logistics platform 220. Cloud computing environment 230 may provide computation, software, data access, storage, and/or other services that do not require end-user knowledge of a physical location and configuration of system(s) and/or device(s) that host adaptive logistics platform 220. As shown, cloud computing environment 230 may include a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 may host adaptive logistics platform 220. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 includes a group of cloud resources, such as one or more applications ("APPs") 222-1, one or more virtual machines ("VMs") 222-2, virtualized storage ("VSs") 222-3, one or more hypervisors ("HYPs") 222-4, or the like.

Application 222-1 includes one or more software applications that may be provided to or accessed by user device 210. Application 222-1 may eliminate a need to install and execute the software applications on user device 210. For example, application 222-1 may include software associated with adaptive logistics platform 220 and/or any other software capable of being provided via cloud computing environment 230. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., user device 210), and may manage infrastructure of cloud computing environment 230, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 may provide hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Company storage device 240 includes one or more devices capable of receiving, generating, storing, processing, and/or providing information relating to generating, or updating a schedule. For example, company device 240 may include a computing device, such as a mobile phone (e.g., a smart phone, a radiotelephone, etc.), a laptop computer, a tablet computer, a handheld computer, a server, a group of servers, or a similar type of device. In some implementations, a company user may interact with company storage device 240 to provide company data (e.g., policy information, historical information of employee preferences, etc.) to one or more other devices of environment 200 (e.g., user device 210 and/or adaptive logistics platform 220).

External device 250 includes one or more devices capable of receiving, generating, storing, processing, monitoring, capturing, and/or providing scheduling information and/or event information. For example, external device 250 may include a computing device, such as a desktop computer, a laptop computer, a mobile device (e.g., a smart phone, a radiotelephone, etc.), a tablet computer, a wearable computer (e.g., a smart watch, a smart band, or a smart pair of eyeglasses), a server, a camera, a sensor, a satellite, or the like. In some implementations, external device 250 may be an external server and one or more devices of environment 200 may interact with the external server to obtain broadcast news, current events, or the like. Additionally, or alternatively, external device 250 may be an external sensor, and one or more devices of environment 200 may interact with the external sensor to obtain readings and/or measurements (e.g., a traffic reading, a temperature measurement, etc.).

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
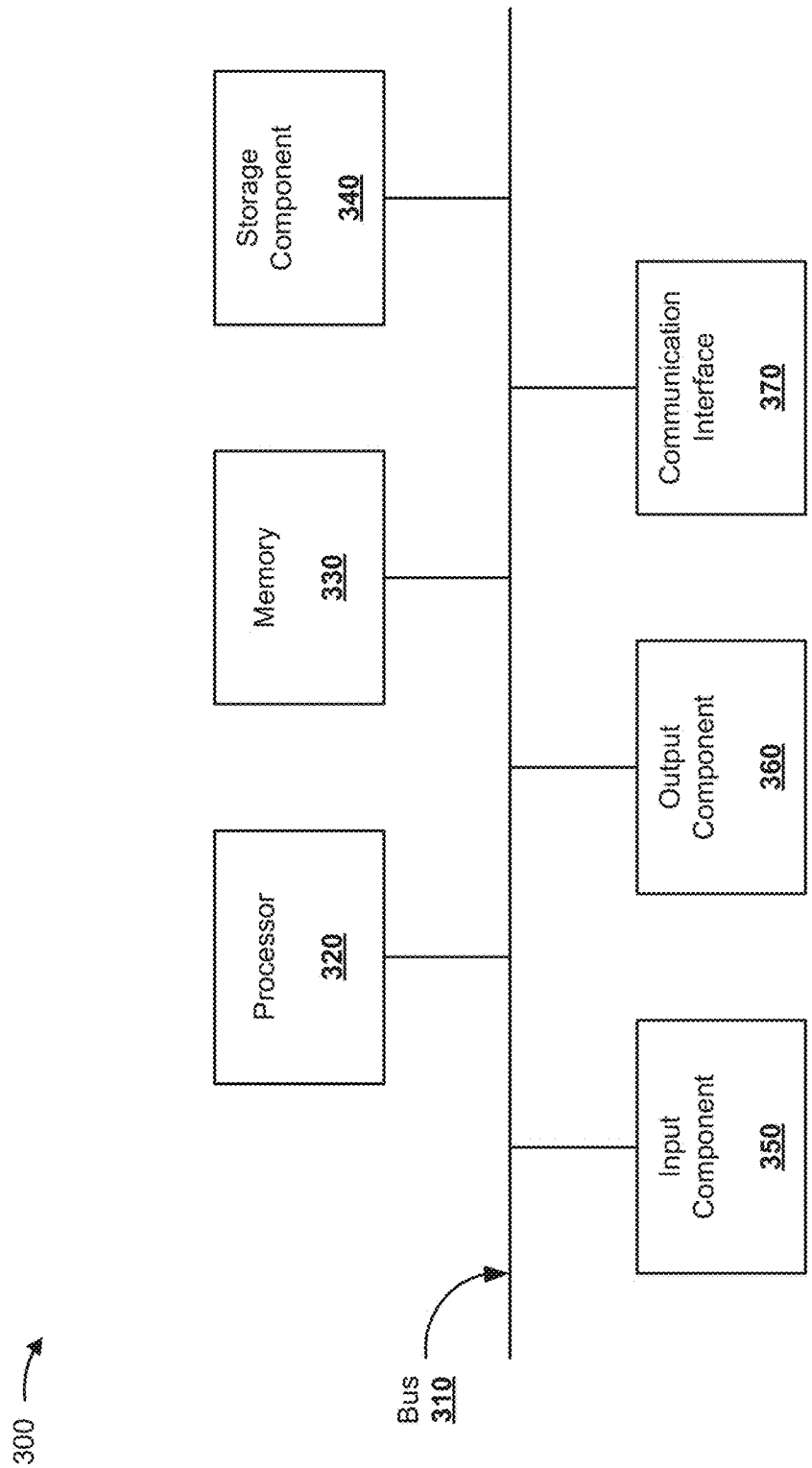
FIG. 3 is a diagram of example components of one or more devices of FIG. 2.

FIG. 3 is a diagram of example components of a device 300. Device 300 may correspond to user device 210, adaptive logistics platform 220, computing resource 222, cloud computing environment 230, company storage device 240, and/or external device 250. In some implementations, user device 210, adaptive logistics platform 220, computing resource 222, cloud computing environment 230, company storage device 240, and/or external device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for generating and updating schedules based on preference data, competing objectives, and contextual data associated with events that may impact the schedule. In some implementations, one or more process blocks of FIG. 4 may be performed by adaptive logistics platform 220. In some implementations, one or more process blocks of FIG. 4 may be performed by another device or a group of devices separate from or including adaptive logistics platform 220, such as user device 210, company storage device 240, and/or external device 250.

As shown in FIG. 4, process 400 may include obtaining user preference data, company preference data, and/or external preference data (block 410). For example, adaptive logistics platform 220 may obtain user preference data (i.e. a type of internal preference data) from user device 210, company preference data (i.e. a type of internal preference data) from company device 240 and/or user device 210, and/or external preference data (e.g., data indicating the preference of third-parties) from an external source such as external device(s) 250. Adaptive logistics platform 220 may store the incoming preference data as bookable items. A bookable item may include items that are capable of being booked, visited, or scheduled, such as a mode of travel (e.g., a vehicle, a plane, a taxi, etc.), a place (e.g., an airport, a hotel, a restaurant, an exhibit, etc.), an event (e.g., a company meeting, a concert, a show, etc.), or the like. In some implementations, a user preference may indicate a bookable item directly (e.g., the user may input a specific bookable item preference, such as hotel A or restaurant B). Additionally, or alternatively, a user preference may be used to select a bookable item (e.g., a user preference may indicate a seafood allergy and adaptive logistics platform 220 may use the preference to exclude seafood restaurants when planning the trip schedule).

In some implementations, adaptive logistics platform 220 may obtain user preference data from user device 210. For example, adaptive logistics platform 220 may obtain (e.g., receive) user preference data from user device 210 via a user profile. A user profile may include user preference data such as identifying information (e.g., a name, a username, an age, a gender, etc.), preference information (e.g., a lodging preference, a food preference, a transportation preference, a time preference, a safety preference, a budget preference, etc.), or the like. Here, a user may access an interface of user device 210 (e.g., an application interface, an interface associated with a web page or web portal, etc.) to input user preference data into the user profile, and adaptive logistics platform 220 may receive and store the user preference data.

Additionally, or alternatively, adaptive logistics platform 220 may obtain historical user preference data. For example, adaptive logistics platform 220 may obtain historical user preference data from user device 210 and/or company storage device 240. In some cases, historical user preference data may indicate bookable items selected by the user in previous schedules. As an example, the user may have scored bookable items from past schedules or provided feedback. Here, adaptive logistics platform 220 may obtain the scored bookable items from past schedules directly from user input (e.g., a user may input historical preference information into an interface of user device 210), and/or by searching a company or third-party webpage that includes reviews written by the user (e.g., by searching via a username or email address of the user). Adaptive logistics platform 220 may use the historical user preference data for generating schedules that consider these historical preferences.

In some implementations, adaptive logistics platform 220 may obtain company preference data from company storage device 240 and/or user device 210. For example, adaptive logistics platform 220 may obtain (e.g., receive) company preference data from company storage device 240 and/or user device 210 via a company profile. A company profile may include company preference data such as company information (e.g., a company name, a list of company owners or administrators capable of accessing the company profile, etc.), company preference information (e.g., a lodging preference, a food preference, a transportation preference, a time preference, a safety preference, a budget preference, etc.), or the like. Here, a user, such as a company owner or administrator, may access an interface on company storage device 240 and/or user device 210 to input company preference data into the company profile, and adaptive logistics platform 220 may receive and store the company preference data.

Additionally, or alternatively, adaptive logistics platform 220 may obtain historical company preference data. For example, adaptive logistics platform 220 may obtain historical company preference data from user device 210 and/or company storage device 240. In some cases, historical company preference data may indicate bookable items selected by the company in previous schedules. As an example, a company user (e.g., a company owner or administrator) may have scored bookable items from past schedules or provided feedback. Adaptive logistics platform 220 may obtain the scored bookable items from past schedules directly from user input (e.g., a company user may input historical preference information into an interface of user device 210 and/or company storage device 240), and/or by searching a company or third-party webpage that includes reviews written by the user (e.g., by searching via a username or email address of the user). Adaptive logistics platform 220 may use the historical company preference data for generating schedules that consider these historical preferences.

In some implementations, adaptive logistics platform 220 may obtain external preference data from external device 250. For example, adaptive logistics platform 220 may obtain external preference data from external device 250 by using data mining techniques to extract text indicative of schedule or travel-related information from third-party sources (e.g., from websites via the Internet). External preferences data may include data indicative of a lodging review, a food review, a transportation review, city data, weather data, or the like. Here, adaptive logistics platform 220 may execute a data mining algorithm to extract data from websites that contain travel reviews, and adaptive logistics platform 220 may store the data indicative of the travel reviews with the other preference data. As an example, adaptive logistics platform 220 may extract lodging data from a travel review website to obtain a lodging review score (e.g., a score indicating a third-party user's rating of a particular hotel in a particular travel hotspot). Adaptive logistics platform 220 may store metadata relating to the lodging review with the other preference data.

As further shown in FIG. 4, process 400 may include generating a list of ranked schedules based on the user preference data, the company preference data, and/or the external preference data (block 420). For example, adaptive logistics platform 220 may generate the list of ranked schedules, for user device 210, based on the user preference data, the company preference data, and/or the external preference data. The list of schedules may include one or more schedules, where each schedule includes one or more bookable items, and the schedules may be ranked based on certain criteria, as described further herein.

In some implementations, adaptive logistics platform 220 may generate a list of schedules based on bookable items. For example, adaptive logistics platform 220 may generate a list of schedules for a user accessing user device 210 by considering different permutations of bookable items. As an example, a schedule may include three bookable items (e.g., a bookable item for a flight, a bookable item for a hotel, and a bookable item for a tourist activity), and there may be thousands of permutations of different bookable items (e.g., five different airlines to choose between, fifty different hotels to choose between, hundreds of different tourist activities or events to choose between, etc.). In this case, adaptive logistics platform 220 may generate schedules for all possible permutations of the three bookable item trip (e.g., a schedule may provide for using airline A, staying at hotel A, and attending tourist activity A). In some cases, adaptive logistics platform 220 may eliminate bookable item permutations that are not viable due to certain preferences. For example, if a user profile indicates that the user has a seafood allergy, adaptive logistics platform 220 may eliminate bookable item permutations that include seafood restaurants. By eliminating bookable item permutations that are not viable to a particular user, adaptive logistics platform 220 conserves computing resources while also improving user satisfaction.

In some implementations, adaptive logistics platform 220 may generate a list of schedules by assigning bookable items in a schedule a bookable item review score for one or more categories. For example, adaptive logistics platform 220 may, for a bookable item in a schedule, generate a bookable item review score for one or more categories associated with the schedule. A category may indicate a criteria for which a schedule can be scored. For example, a schedule may have a health score, a safety score, a budget score, a time score, or the like. As an example, if a schedule represents travel plans for a company business trip, adaptive logistics platform 220 may generate, for a bookable item in the company business trip schedule, a bookable item review score for a safety category, a bookable item review score for a health category, a bookable item review score for a budget category, and/or a bookable item review score for a time category. Adaptive logistics platform 220 may generate the bookable item review score for the one or more categories for all bookable items in the schedule.

As an example, adaptive logistics platform 220 may select, as a bookable item indicative of a user lodging preference, a five-star hotel. Adaptive logistics platform 220 may generate category review scores for the five-star hotel. For example, adaptive logistics platform 220 may generate a bookable item review score for safety, a bookable item review score for health, a bookable item review score for budget, and/or a bookable item review score for time. Here, the five-star hotel may have a high bookable item review score for safety (e.g., due to installation of a new security system), a high bookable item review score for health (e.g., due to healthy hotel amenities such as an in-hotel gym), a low bookable item review score for budget (e.g., due to high cost), and a variable bookable item review score for time based on distance to the other bookable item events planned during the trip (e.g., company meetings, sight-seeing exhibits, etc.).

In some implementations, adaptive logistics platform 220 may generate a bookable item review score by obtaining historical data and external data about the bookable item. For example, adaptive logistics platform 220 may execute a data mining algorithm to extract third-party external data for the bookable item. In this case, adaptive logistics platform 220 may extract external data, such as reviews for a bookable item, and may store the reviews in an adaptive logistics platform 220 database. Adaptive logistics platform 220 may use natural language processing techniques (e.g., a semantic analysis) to analyze the extracted external data and determine a bookable item score. As an example, prior to extracting and analyzing external data, assume adaptive logistics platform 220 stores a bookable item that indicates a user preference for a five-star hotel. Adaptive logistics platform 220 may extract external data relating to the five-star hotel (e.g., from the five-star hotel website, from third-party hotel review websites, etc.), may analyze the extracted data relating to the five-star hotel to generate a bookable item review score, and may store the bookable item review score in the adaptive logistics platform 220 database.

Additionally, or alternatively, adaptive logistics platform 220 may assign bookable items a bookable item review score based on a weighted user input. For example, the user profile and the company profile may be associated with an interface that presents the user with a variety of different travel options, and the user may provide input that assigns scores to the different travel options based on the particular user preferences. In this case, a company administrator may be permitted to weight the preferences of all parties to ensure that both the user and the company preferences are taken into consideration. As an example, an interface on user device 210 may provide a user with five hotel choices for a company business trip, and the user may be prompted to rank the hotels based on user preference. An interface on company storage device 240 may prompt the company administrator to rank the hotels based on company preference. Here, the company administrator may apply a weighting scheme that applies 67% weight to company preferences and 33% weight to employee preferences. If the company employees were to all select a five-star hotel, and a company administrator, acting on behalf of the company, selects a two-star hotel, adaptive logistics platform 220 may account for both parties interests by selecting a three-star hotel for the company trip.

In addition, adaptive logistics platform 220 may provide for a critical factor setting that allows employee preferences to outweigh company preferences in special cases. For example, adaptive logistics platform 220 may allow an employee restaurant preference to outweigh the company restaurant preference if the employee has a severe allergy to a food found in the company restaurant preference. By providing for a critical factor setting, adaptive logistics platform 220 may allow for consideration of competing priorities and preferences while also protecting the safety of the user throughout the trip. Moreover, the critical factor setting conserves processing resources because it provides the user with an accurate initial schedule, rather than having to reschedule the restaurant reservation at a later time period.

In some implementations, adaptive logistics platform 220 may determine the bookable item review score by executing one or more bookable item scoring algorithms. The bookable item scoring algorithms may consider the review scores of bookable items, the review scores for individual amenities or services associated with the bookable items, and may use a weight to consider the relationship between the bookable item, the amenities or services associated with the bookable item, and the category. As an example, adaptive logistics platform 220 may execute a bookable item scoring algorithm for the safety category, a bookable item scoring algorithm for the health category, a bookable item scoring algorithm for the budget category, a bookable item scoring algorithm for the time category, or the like.

For example, adaptive logistics platform 220 may, for a bookable item in a schedule, determine a score for the safety category by executing a bookable item scoring algorithm that considers a safety review score of a bookable item in a schedule, one or more amenity review scores for the amenities associated with the bookable item, and/or a weight to consider the degree of relevancy of the amenities to safety. As an example, adaptive logistics platform 220 may determine the bookable item score for the safety category based on the formula:

$$f(O_{safety}, B) = R(B) \times \left[ \sum_{i=1}^{k} \left( R(a_j) \times \frac{1}{1 + e^{d_{a_i}}} \right) \div k \right] \quad (1)$$

In equation 1, the term $f(O_{safety}, B)$ may represent the total safety score for a bookable item in a schedule. Adaptive logistics platform 220 may determine the total safety score for a bookable item in a schedule by considering a safety review score for the bookable item (R(B)), by considering safety review scores for amenities associated with the bookable item ($\Sigma_{i=1}^{k} R(a_j)$), by considering a weight to determine the degree of relevancy of an amenity to safety $$\left( \frac{1}{1 + e^{d_{a_i}}} \right),$$

and by normalizing the weighted amenity score (e.g., by taking the average by dividing by k). Here, adaptive logistics platform 220 may, for one or more amenities associated with a bookable item, take the summation of the weighted amenity review scores $$\left[ \sum_{i=1}^{k} \left( R(a_j) \times \frac{1}{1 + e^{d_{a_i}}} \right) \right].$$

Here, a weighted amenity review score is determined by multiplying the amenity review score ($R(a_j)$) against a weight $$\left( \left( \frac{1}{1 + e^{d_{a_i}}} \right) \right),$$

where d represents a distance or semantic relationship between amenity review score $a_j$ and the safety category.

Next, adaptive logistics platform 220 may normalize the weighted amenity review scores by dividing the summation of the weighted amenity review scores by k total amenities. Lastly, adaptive logistics platform 220 may multiply the normalized and weighted amenity review scores for amenities against the bookable item score (R(B)) to determine the total safety score for a bookable item. Adaptive logistics platform 220 may execute this algorithm for all bookable items in a schedule, and may apply a similar algorithm to determine the total health score of a bookable item.

As another example, adaptive logistics platform 220 may, for a bookable item in a schedule, determine a total score for the budget category by executing a bookable item scoring algorithm that considers a daily budget (e.g., in dollars), a total number of days for the budget, and a weight. The weight may indicate a relationship between bookable items in a schedule (e.g., a bookable item for a hotel may weigh more than a bookable item for a concert because the hotel is more important to the user). Adaptive logistics platform 220 may determine the bookable item score for the budget category based on the formula:

$$f(O_{budget}, B) = \mu_j \times q_j \times a_j \qquad (2)$$

In equation 2, the term $f(O_{budget}, B)$ may represent the total budget score for a bookable item in a schedule. Adaptive logistics platform 220 may determine the total budget score for a bookable item in a schedule by multiplying a daily budget quantity ($\mu_j$) and a total number of days for the budget ($q_j$), and may multiply the product of these two values with a weighting factor ($a_j$) that considers the degree of importance of the bookable item in relation to other bookable items in the schedule. Adaptive logistics platform 220 may execute this bookable item scoring algorithm for all bookable items in the schedule.

As another example, adaptive logistics platform 220 may, for a bookable item in a schedule, determine a total score for the time category by executing a bookable item scoring algorithm that considers the geographic distance and/or travel time between the bookable item in relation to other bookable items in the same schedule. Adaptive logistics platform 220 may determine the total time score for a bookable item in a schedule by comparing the time it takes to travel between two bookable items, given a particular transportation means. In this case, adaptive logistics platform 220 may use a bookable item, such as a hotel or company meeting, as the primary reference point. Next, adaptive logistics platform 220 may determine the time it takes to travel between a particular bookable item (e.g., a restaurant) and the bookable item used as the primary reference point (e.g., the hotel), given a particular means of transportation (e.g., a car, a bicycle, a bus, etc.). Bookable items that are closest in time to the primary reference point may receive higher time scores than bookable items that are far away from the primary reference point. Adaptive logistics platform 220 may execute this bookable item scoring algorithm for all bookable items in the schedule.

In some implementations, after adaptive logistics platform 220 determines a total bookable item score for the categories (e.g., a bookable item score for safety, a bookable item score for health, a bookable item score for budget, and a bookable item score for time), adaptive logistics platform 220 may store the categorical scores together as the overall schedule score. As an example, adaptive logistics platform 220 may determine the overall schedule score based on the formula:

$$S = <\Sigma f(O_{health}, B), \Sigma f(O_{safety}, B), \Sigma f(O_{budget}, B), \Sigma f(O_{time}, B_i, B_j, M)> \qquad (3)$$

In equation 3, for a particular schedule, the value S may represent a list or an array containing overall category scores for health, safety, budget, and time. Adaptive logistics platform 220 may take the summation of scores for a particular category, and store the total category score in the list or array.

Additionally, or alternatively, adaptive logistics platform 220 may assign weights to user preference data and/or historical user preference data. For example, adaptive logistics platform 220 may assign weights to user preference data by weighting bookable items in the user profile, may assign weights to historical user preference data by weighting the bookable items of historical user profiles, or may assign weights to both user preference data and historical user preference data by weighting both the user profile and historical user profiles. As an example, for the safety category, the health category, the budget category, and the time category, adaptive logistics platform 220 may determine a weighted average score based on the preference data. As an example for the health category, adaptive logistics platform 220 may determine the weighted preference score based on the formula:

$$E_{health} = \sum_{i=1}^{k} \left( \frac{1}{1 + e^{d(B_i, health)}} \right) \qquad (4)$$

As shown in equation 4, $E_{health}$ may represent the weighted preference score for the health category. Adaptive logistics platform 220 may, for bookable items in a user profile, for bookable items in historical user profiles, or for bookable items in both the user profile and historical user profiles, determine the degree to which the bookable items relate to the health category by using external device 250 to extract data regarding the semantic relationship between the health category and the bookable item (e.g., as shown by $$\left( \frac{1}{1 + e^{d(B_i, health)}} \right)).$$

As an example, external device 250 may provide a service (e.g., using an interface) that allows a user to semantically query relationships between items. Adaptive logistics platform 220 may use external device 250 to determine a semantic similarity score that represents the semantic relationship between health and a bookable item (e.g., a five-star hotel), where the value for d represents the degree to which the bookable item $B_i$ is related to the health category. As an example, a user profile may indicate a preference for a five-star hotel, and external device 250 may determine that the five-star hotel has a strong correlation to the health category (e.g., due to the hotel having healthy amenities), which adaptive logistics platform 220 may store as the value d in the equation above. Adaptive logistics platform 220 may repeat this determination for all bookable items in the user profile and may take the summation of the weighted scores for all bookable items in the user profile. Adaptive logistics platform 220 may repeat this process until an average weighted score is obtained for the remainder of the categories (e.g., safety, budget, and time).

In some implementations, adaptive logistics platform 220 may rank the list of schedules based on the assigned weights. As an example, adaptive logistics platform 220 may generate the ranked list of schedules based on the formula:

$$F(\{C\},\{U\},S) = <C_1, \ldots, C_n> \times <E_1, \ldots, E_n> \quad (5)$$

In equation 5, F({C}, {U}, S) may represent a final schedule score given a set of categories {C}, a set of preferences {U} for a particular schedule S, and adaptive logistics platform 220 may store the final score as a list or array of values where a value represents the final score for a particular category. In this case, adaptive logistics platform 220 may determine final weighted scores by multiplying the total category scores from equation 3 ($C_1, \ldots, C_n$) by the weighted preference scores from equation 4 ($E_1, \ldots, E_n$). Adaptive logistics platform 220 may rank the schedules by total score. As an example, adaptive logistics platform 220 may rank the schedule with the highest safety score as the top safety score, and may use the ranked list of schedules to select a schedule for user device 210.

In some implementations, adaptive logistics platform 220 may generate one or more category scores for a plurality of schedules included in the list of schedules, based on the company preference data. For example, adaptive logistics platform 220 may generate one or more category scores (e.g., a score for the safety category, a score for the health category, a score for the budget category, a score for the time category, etc.), for a plurality of schedules included in the list of schedules, based on the company preference data.

By generating a list of ranked schedules that account for a variety of competing priorities, adaptive logistics platform 220 is able to select a mutually beneficial schedule. Furthermore, adaptive logistics platform 220 conserves processing resources by using natural language processing techniques to improve the quality and accuracy of the schedules generated.

As shown in FIG. 4, process 400 may include selecting a schedule based on the ranked list of schedules (block 430). For example, adaptive logistics platform 220 may select a schedule for user device 210 based on the ranked list of schedules. As an example, the ranked list of schedules (i.e. created from a plurality of schedules that is included in the list of schedules) may be generated for display on an interface of user device 210, and a user accessing user device 210 may select a schedule from the ranked list.

In some implementations, adaptive logistics platform 220 may automatically select a schedule to send to user device 210. For example, adaptive logistics platform 220 may be programmed to automatically select a schedule, from a ranked list of hundreds, if not thousands, of schedules, to send to hundreds, if not thousands, of user devices 210 when a criterion is satisfied (e.g., when the ranked list of schedules is generated). In this case, after the ranked list of schedules is generated, adaptive logistics platform 220 may automatically select a schedule to send to user devices 210 (e.g., to one or more company administrators, to thousands of company employees, etc.), and adaptive logistics platform 220 may select the schedule that maximizes both company and user preferences (e.g., the top ranked schedule).

As an example, for a lodging preference, a 1,000 employee company may have 500 users input a preference for a five-star hotel, 400 users input a preference for a four-star hotel, and 100 users input a preference for three-star hotel. A company administrator may input a preference for a three-star hotel and the company administrator choice may be weighted as 70% of the total decision (i.e. the employees preferences take up the remaining 30%). The employees and administrators may make similar preference decisions for other bookable items relating to the company trip. Adaptive logistics platform 220 may consider these weighted preferences and may automatically select a number of three and four star hotels that correspond to the weighted preferences. By automatically selecting the schedule that maximize both company and user preferences, and automatically sending the selected schedule to hundreds, if not thousands, of user devices 210, adaptive logistics platform 220 may satisfy both parties needs while conserving processing resources by presenting only the selected schedule for display on user device 210 (e.g., and not the entire ranked list of schedules).

In some implementations, adaptive logistics platform 220 may select a schedule and perform additional automated actions. For example, adaptive logistics platform 220 may select a schedule and automatically display the schedule on an interface of user device 210. In addition to displaying the schedule on an interface of user device 210, adaptive logistics platform 220 may automatically purchase tickets to a particular event, automatically book transportation to and from an event, automatically book flights, automatically book reservations for a particular hotel or restaurant, send reminder notifications (e.g., via text) to employees to provide notice of when the next bookable item on the selected schedule will occur, and the like.

In some implementations, adaptive logistics platform 220 may allow a user accessing user device 210 to select a schedule from the ranked list of schedules. In this case, the ranked list of schedules may be displayed on an interface on user device 210. In addition, the interface of user device 210 may display incentives which may reward a user for selecting a particular schedule from the ranked list of schedules. In some cases, a user may accept the particular schedule offered and receive an incentive. In other cases, a user may decline the particular schedule offered and may provide feedback indicating the reason for not accepting the particular schedule.

In some implementations, adaptive logistics platform 220 may utilize artificial intelligence models to predict user preferences based on the user feedback. For example, adaptive logistics platform 220 may update one or more artificial intelligence models based on the user feedback, and may use the artificial intelligence models to predict the user preferences. As an example, a user may, on numerous occasions, reject schedules for company business trips that include seafood restaurants. While the user may have indicated a preference for seafood on the user profile, it may be the case that the user does not enjoy seafood when on company business trips. In this case, adaptive logistics platform 220 may update one or more artificial intelligence models and may use the models to predict that the user does not want seafood on the next company business trip (e.g., despite an indication of a seafood preference on the stored user profile, the models may notice the trend created from the reoccurring schedule rejections and adaptive logistics platform 220 may make a prediction that goes against data stored in the user profile).

As shown in FIG. 4, process 400 may include generating a knowledge graph for the list of schedules (block 440). For example, adaptive logistics platform 220 may generate a knowledge graph that considers the list of schedules and the relationships that exist between those schedules. A knowledge graph may be a data structure that stores data representing the lists of schedules and/or data representing relationships between the lists of schedules. A knowledge graph may be represented graphically as a graph containing nodes and edges, or, alternatively, with a matrix or list (e.g., via an adjacency list, an adjacency matrix, an accidence matrix, or the like). When discussing the graphical representation of the knowledge graph, a node may represent a schedule, and an edge that connects two nodes may represent a relationship between the two schedules represented by the two nodes. A relationship between two schedules may express the degree of similarity between the two schedules. For example, as depicted by the knowledge graph in FIG. 1C, node S2 (e.g., the schedule with the second highest safety score) may have an edge connecting to node S1 (e.g., the schedule with the highest safety score), with a value of 0.95. This may indicate that the schedule represented by node S2 is 95% similar to the schedule represented by node S1.

In some implementations, adaptive logistics platform 220 may generate the knowledge graph by storing values indicating the degree of similarity between schedules. For example, adaptive logistics platform 220 may store a value indicating the degree of similarity between the schedule with the highest-ranked safety score and the schedule with the highest-ranked health score. In this example, the schedule with the top-ranked safety score may be represented by an array containing values for the categorical scores (e.g., schedule S1, with a safety score of 100, a health score of 83, a budget score of 12, and a time score of 67), and the schedule with the top-ranked health score may be represented by an array containing values for the categorical scores (e.g., schedule H1, with a safety score of 77, a health score of 100, a budget score of 18, and a time score of 23). Adaptive logistics platform 220 may store the two schedules using a knowledge graph where the two schedules are represented as node S1 and node H1, respectively, and the nodes may be connected via edge values that indicate the similarity between the nodes (e.g., for the safety category, an edge from S1 to H1 may contain a score of 0.77, indicating that the bookable items of the H1 schedule are 77% similar to the bookable items of the S1 schedule with regard to safety).

When an event occurs that causes schedules to change, adaptive logistics platform 220 may update the edge values of the knowledge graph. By updating the schedules with a knowledge graph, adaptive logistics platform 220 may conserve computing resources by creating dynamically updateable relationships between schedules, without having to re-generate schedules or recalculate scores for every schedule.

As shown in FIG. 4, process 400 may include monitoring contextual data relating to the selected schedule (block 450). For example, adaptive logistics platform 220 may monitor contextual data relating to the selected schedule for a user. Contextual data may include any event that causes a change to the selected schedule, such as an affirmative user action (e.g., a user request to change a schedule), user location information (e.g., a tracked GPS location may indicate that a user has deviated from the schedule), an external event (e.g., a hotel closing down due to a strike), or the like.

In some implementations, after sending the initial schedule to user device 210, adaptive logistics platform 220 may monitor contextual data, such as user feedback, throughout the course of the planned trip. For example, during the course of the planned trip, a user accessing user device 210 may send, to adaptive logistics platform 220, a request to change the selected schedule. In this case, a user may input the request into an application interface of user device 210 and adaptive logistics platform 220 may receive and store the schedule change request. As an example, a user may realize that a seafood allergy was not initially recorded in the user profile and as a result may need the seafood restaurant to be removed from the selected schedule. Here, adaptive logistics platform 220 may receive the schedule change request from the user and allow the user to select a new restaurant for the selected schedule. In some cases, rather than update the selected schedule, adaptive logistics platform 220 may store the change request as a preference, which can be used to generate future schedules. In other cases, adaptive logistics platform 220 may permit the user to select a new schedule, as described further herein.

Additionally, or alternatively, adaptive logistics platform 220 may monitor contextual data, such as user location information, throughout the course of the planned trip. For example, adaptive logistics platform 220 may use GPS tracking to monitor the time and location of user device 210. Furthermore, adaptive logistics platform 220 may monitor the GPS location of user device 210 to store information indicating a new user preference. For example, if the selected schedule has a dinner scheduled at restaurant A, and the GPS tracker indicates that user device 210 is not at restaurant A, but is across the street at restaurant B, adaptive logistics platform 220 may update the schedule to account for a user preference for restaurant B. Alternatively, rather than update the selected schedule, adaptive logistics platform 220 may store the alteration in the schedule but permit the user to continue with the selected schedule.

Additionally, or alternatively, adaptive logistics platform 220 may monitor external events using information obtained by accessing external sensors operated by third parties. For example, adaptive logistics platform 220 may monitor external events (e.g., traffic data, weather data, etc.) by extracting sensor data from third-party webpages that operate external sensors to measure the environment around user device 210 during the course of the trip. As an example, the selected schedule may indicate that the user is to take a taxi to the scheduled restaurant for a dinner reservation. However, adaptive logistics platform 220 may extract motion sensor traffic data from city webpages, and the traffic data may be used to predict that the taxi is likely to encounter high-volume traffic during the ride to the scheduled restaurant. In this case, adaptive logistics platform 220 may offer a new bookable item in place of the scheduled bookable item (e.g., to travel by train instead of by taxi).

Additionally, or alternatively, adaptive logistics platform 220 may monitor external events using information obtained by accessing third-party webpages. For example, adaptive logistics platform 220 may use natural language processing techniques to extract text from webpages (e.g., social media webpages, news webpages, city webpages, weather webpages, etc.) to determine if events in the geographic region of the scheduled trip may change the schedule. Here, adaptive logistics platform 220 may use natural language processing techniques to determine whether the event has any influence over the selected schedules bookable items. As an example, adaptive logistics platform 220 may extract text from Twitter indicating that a worker strike has closed down Hotel A, which may be the hotel used in the selected schedule. In this case, adaptive logistics platform 220 may use natural language processing techniques to extract textual phrases from Twitter such as "worker strike closes down hotel A." Next, adaptive logistics platform 220 may perform a semantic analysis on the phrase to determine the degree to which the event may influence the planned schedule. For example, adaptive logistics platform 220 may determine that an event has occurred at Hotel A which may decrease the safety score, and this may cause adaptive logistics platform 220 to select a new schedule or update the selected schedule with a new lodging preference. By using data mining and natural language processing techniques to monitor contextual data, adaptive logistics platform 220 conserves processing resources and improves the quality and accuracy of the schedules generated.

As shown in FIG. 4, process 400 may include selecting a new schedule based on the contextual data and the knowledge graph (block 460). For example, adaptive logistics platform 220 may use contextual data to update the knowledge graph, and may use the updated knowledge graph to select a new schedule for display on user device 210.

In some implementations, adaptive logistics platform 220 may update the knowledge graph based on the contextual data. For example, adaptive logistics platform 220 may update the knowledge graph when the selected schedule is influenced by events (e.g., user feedback, user location information, external events, etc.) occurring throughout the course of the trip. When contextual data causes a bookable item in the selected schedule to change, adaptive logistics platform 220 may update the knowledge graph.

In some implementations, adaptive logistics platform 220 may update the knowledge graph when a parameter associated with an external event is within a threshold range of a bookable item in the selected schedule. For example, if the bookable item in the selected schedule is outside of the threshold range of the external event, adaptive logistics platform 220 may continue monitoring the contextual data. However, if the bookable item in the selected schedule is within the threshold range of the external event, adaptive logistics platform 220 may update the knowledge graph by defining a decaying factor and rescoring the edges of the knowledge graph based on the decaying factor. In this case, adaptive logistics platform 220 may use natural language processing techniques to define the decaying factor. For example, adaptive logistics platform 220 may base the degree of influence of the decaying factor on the degree of negative influence the external event may have on the bookable item. As an example, with respect to the safety category, a hotel fire may result in a larger decaying factor than a harmless public protest in front of the hotel. Adaptive logistics platform 220 may update the edge values of the knowledge graph based on the decaying factor. For example, adaptive logistics platform 220 may subtract the decaying factor from the edge values of the knowledge graph that are influenced by the external event. By updating the edge value of the knowledge graph, adaptive logistics platform 220 conserves processing resources by not having to replace and rescore the node values.

Alternatively, when contextual data causes a bookable item in the selected schedule to change, adaptive logistics platform 220 may update the node that represents the selected schedule (e.g., by selecting a replacement bookable item), and adaptive logistics platform 220 may also update other nodes that use the same bookable item (e.g., other schedules in the list of ranked schedules may include the bookable item that may be changed). After updating the node(s) by selecting a replacement bookable item, adaptive logistics platform 220 may rescore the category values associated with the updated node(s) (e.g., by rescoring values for the safety category, the health category, the budget category, and the time category). Next, adaptive logistics platform 220 may rescore the edge values connecting the updated node(s) to other nodes.

As an example, a four-star hotel that is used as part of the selected schedule may close down due to a worker strike. In this case, adaptive logistics platform 220 may update the selected schedule and all other schedules that included the four-star hotel by selecting a new hotel. Next, adaptive logistics platform 220 may rescore the category values associated with the updated node(s) so that the updated node(s) reflect the review score of the new hotel. Lastly, adaptive logistics platform 220 may rescore the value of the edges that connect to the updated node(s) by recalculating the degree of similarity between the updated node(s) and corresponding connecting nodes.

In some implementations, adaptive logistics platform 220 may use the updated knowledge graph to select a new schedule for display on user device 210. For example, adaptive logistics platform 220 may use the updated knowledge graph to generate a re-ranked list of schedules, and may display the re-ranked list of schedules on user device 210 to allow a user to select a new schedule.

In some implementations, adaptive logistics platform 220 may recommend a particular schedule from the re-ranked list of schedules and may provide user device 210 with an explanation as to why the changes are necessary. For example, adaptive logistics platform 220 may recommend the next-safest schedule and may send a message to user device 210 indicating that the selected schedule had to change due to unforeseen events. In this case, a user accessing user device 210 may accept or reject the recommended schedule and provide a justification for their decision. As an example, a user may accept the recommended schedule and receive an incentive. In this case, adaptive logistics platform 220 may provide an incentive for the recommended schedule so that the user (e.g., an employee) accepts a schedule that is beneficial to both the user (e.g., the employee) and the company.

Alternatively, the user may reject the recommended schedule and may provide adaptive logistics platform 220 with a reason for rejecting the recommended schedule. In this case, adaptive logistics platform 220 may allow the user to select another schedule from the re-ranked list of schedules. As an example, a user accessing user device 210 may reject the recommended schedule change, and may decide to keep the original schedule (e.g., the external event that caused adaptive logistics platform 220 to alter the originally selected schedule may not have had a large impact on the bookable item).

In some implementations, adaptive logistics platform 220 may provide the user with a threshold number of attempts to re-select a schedule. For example, if the user rejects the recommended schedule proposed by adaptive logistics platform 220, an alternate schedule may be presented to the user, and the user may be given a threshold number of opportunities to reject a schedule before one must be selected.

In some implementations, adaptive logistics platform 220 may use contextual data relating to user device 210 to make predictions regarding user preferences. For example, adaptive logistics platform 220 may utilize artificial intelligence models to predict user preferences based on the contextual data. As an example, a selected schedule may provide for allowing the user to take a taxi to the company meeting on day one of the trip. If the user decides to walk to the company meeting, adaptive logistics platform 220 may store the deviation from the schedule. If during the second day of the trip, the user again decides to walk to the company meeting, despite the schedule providing for travel via a taxi, adaptive logistics platform 220 may store the user preference for walking as the new travel preference. The schedule for day three of the trip will, as the bookable item for mode of travel, have the user walking to the company meeting. By predicting the user action for subsequent days of the planned trip, adaptive logistics platform 220 conserves processing resources by reducing the number of times the knowledge graph is updated.

In some implementations, adaptive logistics platform 220 may react to external events relating to user device 210 by automatically updating the selected schedule and performing automated actions in response to the external events. Automated actions may include automatically booking event tickets, automatically sending notifications (e.g., via text) to employees, automatically booking transportation to and from events, automatically booking flights, automatically booking a reservation at a restaurant, or the like. As an example, if an outdoor event is scheduled and the weather forecast has changed to predict a 90% chance of rain, adaptive logistics platform 220 may automatically update the schedule to include an indoor event. In addition, adaptive logistics platform 220 automatically book tickets to the indoor event, send notifications (e.g., via text) to employees indicating that a schedule change has occurred, and book transportation to the indoor event. By performing automated actions in response to external events, adaptive logistics platform 220 conserves processing resources and provides the user with the best available schedule, or a schedule that is better than most.

In some implementations, adaptive logistics platform 220 may perform the steps discussed in blocks 410-460 during a first time interval, and may perform additional steps at a time interval that is different from the first time interval. For example, adaptive logistics platform 220 may receive, at a time interval different from the first time interval, user preference data associated with one or more bookable items. In addition, adaptive logistics platform 220 may receive, at a time interval different from the first time interval, company preference data associated with one or more bookable items. Furthermore, adaptive logistics platform 220 may obtain, at a time interval different from the first time interval, external preference data associated with one or more bookable items. In this case, adaptive logistics platform 220 may use the newly received and obtained preference data to alter the selected schedule.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

By generating schedules that account for a variety of different competing priorities, and by updating the schedules to account for events that impact the schedules, adaptive logistics platform 220 intelligently selects the best schedule for the different competing priorities, or a schedule that is better than other schedules for the different competing priorities. Furthermore, adaptive logistics platform 220 conserves processing resources by utilizing artificial intelligence models to predict user deviations from planned schedules, thereby allowing adaptive logistics platform 220 to predict and provide a schedule that the user will enjoy. Moreover, adaptive logistics platform 220 improves the quality and accuracy of the schedules by using natural language processing, and improves overall performance and operation of the system due to efficient and effective allocation of resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
a memory; and
one or more processors to:
receive user preference data and company preference data associated with one or more bookable items;

obtain external preference data associated with the one or more bookable items by extracting text, associated with the one or more bookable items, from an external source,
 the external preference data being different from the user preference data and the company preference data;
parse the text using natural language processing;
determine, based on parsing the text using natural language processing, one or more scores associated with the one or more bookable items;
generate a list of schedules based on the user preference data, the company preference data, and the external preference data;
generate one or more category scores for a plurality of schedules included in the list of schedules based on the one or more scores associated with the one or more bookable items;
rank the list of schedules based on the one or more category scores;
select a first schedule, from the ranked list of schedules, based on the one or more category scores;
generate a knowledge graph based on the ranked list of schedules,
 the knowledge graph including node values and edge values,
  each node value, of the node values, representing a schedule of the plurality of schedules, and
  each edge value, of the edge values, representing a degree of similarity between two schedules represented by two connected nodes;
monitor contextual data related to the first schedule,
 the contextual data including at least one of:
  information regarding one or more external events,
  information regarding one or more user actions, or
  user location information;
detect, based on monitoring the contextual data, a particular event that impacts a bookable item of the one or more bookable items;
modify the knowledge graph based on detecting the particular event;
select a second schedule based on modifying the knowledge graph; and
perform one or more actions based on selecting the second schedule,
 the one or more actions including at least one of:
  automatically displaying the second schedule on an interface of a user device,
  automatically purchasing tickets,
  automatically booking transportation,
  automatically booking flights,
  automatically booking reservations, or
  automatically sending reminder notifications.

2. The device of claim 1, where the one or more processors, when generating the one or more category scores, are to:
generate the one or more category scores further based on the user preference data or the company preference data.

3. The device of claim 1, where the one or more processors are further to:
apply a weight to the one or more scores associated with the one or more bookable items; and
where the one or more processors, when generating the one or more category scores, are to:
 generate the one or more category scores based on the weight.

4. The device of claim 1, where the one or more processors are further to:
determine that a parameter associated with the particular event satisfies a threshold;
assign a value to the particular event, indicative of a decaying factor, based on determining that the parameter satisfies the threshold; and
update the knowledge graph based on the decaying factor.

5. The device of claim 1, where the one or more processors, when obtaining the external preference data, are to:
use a data mining technique to extract the external preference data from the external source.

6. The device of claim 1, where the one or more processors are further to:
use a data mining technique to extract the contextual data; and
where the one or more processors, when detecting the particular event, are to:
 detect the particular event based on using the data mining technique to extract the contextual data.

7. The device of claim 1, where the one or more processors, when receiving the user preference data and the company preference data associated with the one or more bookable items, are to:
receive historical user preference data and historical company preference data; and
where the one or more processors, when generating the list of schedules, are to:
 generate the list of schedules based on the historical user preference data and the historical company preference data.

8. The device of claim 1, where the one or more processors, when monitoring the contextual data, are to:
monitor for information regarding external event within a geographic area of the user device and/or within a geographic area of the one or more bookable items.

9. A method, comprising:
receiving, by a device, internal preference data associated with one or more bookable items;
obtaining, by the device, external preference data associated with the one or more bookable items,
 the external preference data being different from the internal preference data, and
 the external preference data being obtained by extracting text from an external source;
parsing, by the device, the text using natural language processing;
determining, by the device and based on parsing the text using natural language processing, one or more scores associated with the one or more bookable items;
generating, by the device, a list of schedules based on the internal preference data and the external preference data;
generating, by the device, one or more category scores for a plurality of schedules included in the list of schedules based on the one or more scores associated with the one or more bookable items;
ranking, by the device, the list of schedules based on the one or more category scores;
selecting, by the device, a first schedule of the ranked list of schedules;
generating, by the device, a knowledge graph based on the ranked list of schedules,
 the knowledge graph including node values and edge values, each node value, of the node values, representing a schedule of the plurality of schedules, and each edge value, of the edge values, representing a degree of similarity between two schedules represented by two connected nodes;

monitoring, by the device, contextual data related to the first schedule, the contextual data including at least one of:
information regarding one or more external events,
information regarding one or more user actions, or
user location information;

detecting, by the device and based on monitoring contextual data, a particular event that impacts a bookable item of the one or more bookable items;

modifying, by the device, the knowledge graph based on detecting the particular event;

selecting, by the device, a second schedule based on modifying the knowledge graph; and performing, by the device, one or more actions based on selecting the second schedule, the one or more actions including at least one of:
automatically displaying the second schedule on an interface of a user device,
automatically purchasing tickets,
automatically booking transportation,
automatically booking flights,
automatically booking reservations, or
automatically sending reminder notifications.

10. The method of claim 9, where the first schedule includes a travel itinerary.

11. The method of claim 9, where obtaining the external preference data comprises:
using a data mining technique to extract the external preference data from the external source.

12. The method of claim 9, further comprising:
using a data mining technique to extract the contextual data; and
where detecting the particular event comprises:
detecting the particular event based on using natural language processing to analyze the contextual data.

13. The method of claim 9, where receiving the internal preference data associated with the one or more bookable items comprises:
receiving historical user preference data and historical company preference data; and
where generating the list of schedules comprises:
generating the list of schedules based on the historical user preference data and the historical company preference data.

14. A non-transitory computer-readable medium storing instructions, the instructions comprising:
one or more instructions that, when executed by one or more processors, cause the one or more processors to:
receive user preference data associated with one or more bookable items;
receive company preference data associated with the one or more bookable items;
obtain external preference data associated with the one or more bookable items by extracting text, associated with the one or more bookable items, from an external source,
the external preference data being different from the user preference data and the company preference data;
parse the text using natural language processing;

determine, based on parsing the text using natural language processing, one or more scores associated with the one or more bookable items;
generate a list of schedules based on the user preference data, the company preference data, and the external preference data;
generate one or more category scores for a plurality of schedules included in the list of schedules based on the one or more scores associated with the one or more bookable items;
rank the list of schedules based on the one or more category scores;
select a first schedule, from the ranked list of schedules, based on the one or more category scores;
generate a knowledge graph based on the ranked list of schedules,
the knowledge graph including node values and edge values,
each node value, of the node values, representing a schedule of the plurality of schedules, and
each edge value, of the edge values, representing a degree of similarity between two schedules represented by two connected nodes;
monitor contextual data related to the first schedule,
the contextual data including at least one of:
information regarding one or more external events,
information regarding one or more user actions, or
user location information;
detect, based on monitoring the contextual data, a particular event that impacts a bookable item of the one or more bookable items;
modify the knowledge graph based on detecting the particular event;
select a second schedule based on modifying the knowledge graph; and
perform one or more actions based on selecting the second schedule,
the one or more actions including at least one of:
automatically displaying the second schedule on an interface of a user device,
automatically purchasing tickets,
automatically booking transportation,
automatically booking flights,
automatically booking reservations, or
automatically sending reminder notifications.

15. The non-transitory computer-readable medium of claim 14, where the user preference data includes an employee travel plan; and
where the company preference data includes at least one of:
company policy data, or
historical travel data.

16. The non-transitory computer-readable medium of claim 14, where the user preference data is first user preference data and the external preference data is first external preference data; and
where the one or more instructions, when executed by the one or more processors, further cause the one or more processors to:
receive, after selecting the first schedule, second user preference data or second external preference data; and
alter the first schedule based on the second user preference data or the second external preference data.

17. The non-transitory computer-readable medium of claim 14, where the one or more instructions, when executed by the one or more processors, further cause the one or more processors to:
    apply a weight to the one or more scores associated with the one or more bookable items; and
    where the one or more instructions, that cause the one or more processors to generate the one or more category scores, cause the one or more processors to:
        generate the one or more category scores based on the weight.

18. The non-transitory computer-readable medium of claim 14, where the one or more instructions, when executed by the one or more processors, further cause the one or more processors to:
    store the knowledge graph.

19. The non-transitory computer-readable medium of claim 18, where the one or more instructions, that cause the one or more processors to detect the particular event, cause the one or more processors to:
    detect the particular event by extracting text from the contextual data.

20. The non-transitory computer-readable medium of claim 14, where the one or more instructions, when executed by the one or more processors, further cause the one or more processor to:
    provide information that identifies an incentive for selecting the first schedule from the ranked list of schedules;
    receive user feedback relating to selection of the first schedule from the ranked list of schedules; and
    update the user preference data based on the user feedback.

* * * * *